(12) United States Patent
Minoura et al.

(10) Patent No.: US 9,668,404 B2
(45) Date of Patent: Jun. 6, 2017

(54) MOWER WITH IMPROVED EXHAUST GAS COMPONENT COOLING

(71) Applicant: KUBOTA CORPORATION, Osaka (JP)

(72) Inventors: Akira Minoura, Osaka (JP); Kazuaki Nogami, Osaka (JP); Takahiro Shiraga, Osaka (JP); Hideya Umemoto, Osaka (JP); Seiya Yoshida, Osaka (JP); Hideki Aoki, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 14/840,671

(22) Filed: Aug. 31, 2015

(65) Prior Publication Data

US 2016/0194989 A1     Jul. 7, 2016

(30) Foreign Application Priority Data

Jan. 5, 2015     (JP) .................................. 2015-000359

(51) Int. Cl.
| | |
|---|---|
| *B60K 13/02* | (2006.01) |
| *A01D 34/00* | (2006.01) |
| *F01N 3/021* | (2006.01) |
| *B60K 11/04* | (2006.01) |
| *F01N 13/18* | (2010.01) |
| *A01D 101/00* | (2006.01) |
| *F02M 35/04* | (2006.01) |
| *F02M 35/10* | (2006.01) |

(Continued)

(52) U.S. Cl.
CPC ............. *A01D 34/00* (2013.01); *B60K 11/04* (2013.01); *B60K 13/02* (2013.01); *F01N 3/021* (2013.01); *F01N 13/1805* (2013.01); *A01D 2101/00* (2013.01); *B60K 5/02* (2013.01); *B60K 2005/006* (2013.01); *B60Y 2200/223* (2013.01); *F01N 2260/022* (2013.01); *F01N 2590/08* (2013.01); *F02M 35/048* (2013.01); *F02M 35/10013* (2013.01)

(58) Field of Classification Search
CPC ........ B60K 11/04; B60K 11/08; B60K 13/02; B60K 13/04; B60K 13/06; F01P 11/00; F01P 11/12
See application file for complete search history.

(56) References Cited

U.S. PATENT DOCUMENTS

| | | | |
|---|---|---|---|
| 2012/0307863 A1* | 12/2012 | Tada ..................... | G01K 13/02 374/144 |
| 2013/0256054 A1* | 10/2013 | Nogami ................ | B60K 11/06 180/309 |

FOREIGN PATENT DOCUMENTS

| | | |
|---|---|---|
| JP | 2012-026326 | 2/2012 |
| JP | 2013-209949 | 10/2013 |

\* cited by examiner

*Primary Examiner* — Jonathan Matthias
(74) *Attorney, Agent, or Firm* — Greenblum & Bernstein, P.L.C.

(57) ABSTRACT

A mower includes: a driver's seat provided to a vehicle frame. A transmission is arranged at least partially below the driver's seat. An engine arranged rearward of the transmission such that a bottom end of the engine is positioned higher than a bottom end of the transmission. An exhaust gas purification device is arranged rearward of the engine. An air cleaner is arranged forward of the exhaust gas purification device and above the engine. A radiator extends from an area between the transmission and the engine so as to project further upward than the air cleaner through an area between the driver's seat and the air cleaner.

20 Claims, 10 Drawing Sheets

(51) Int. Cl.
*B60K 5/02* (2006.01)
*B60K 5/00* (2006.01)

MOWER WITH IMPROVED EXHAUST GAS COMPONENT COOLING

CROSS-REFERENCE TO RELATED APPLICATIONS

The present application claims priority under 35 U.S.C. §119 of Japanese Application No. 2015-000359, filed on Jan. 5, 2015, the disclosure of which is expressly incorporated by reference herein in its entirety.

BACKGROUND OF THE INVENTION

1. Field of the Invention

The present invention relates to a mower having a mower unit mounted on a vehicle frame and a diesel engine installed to the rear of a driver's seat. The vehicle frame is suspended on front wheels on a front side and suspended on rear wheels on a rear side. The mower uses a system for improving a cooling of exhaust gas components.

2. Description of Related Art

In order to improve and resolve the environmental concerns of recent years, exhaust gas regulations have been toughened for diesel engines and the like. In work vehicles such as construction or agricultural machinery, various technologies have been developed which reduce particulate matter contained in exhaust gas so as to comply with such exhaust gas regulations. For example, instead of a conventional muffler, an exhaust gas purification device collecting particulate matter contained in exhaust gas may be mounted to a work vehicle. The exhaust gas purification device passes the exhaust gas through a diesel particulate filter (hereafter referred to simply as DPF) installed therein to collect the particulate matter. The collected particulate matter accumulates gradually in the DPF of the exhaust gas purification device, and so in order to prevent the DPF from clogging and prevent an increase in air resistance of the exhaust system, the particulate matter must be burned off and the DPF renewed. Therefore, an outer surface of the exhaust gas purification device housing the DPF must be configured to avoid being excessively cooled, and an exhaust pipe must be effectively cooled so as to reduce a temperature of the exhaust gas discharged to the exterior from the exhaust gas purification device. In order to accomplish this, a large air inflow space must be preserved forward of a radiator, which acts as an external air intake opening to an engine compartment, in order to circulate a sufficient amount of cooling air to the engine compartment where the diesel engine is arranged.

A work vehicle disclosed in Japanese Patent Laid-open Publication No. 2012-026326 is configured as a riding mower having a mower unit arranged below a vehicle frame between left-right pairs of front and rear wheels, a driver's seat arranged at a center portion of the vehicle frame, an engine compartment covered by a hood formed at a rear portion of the vehicle frame, and an engine and engine components arranged within the engine compartment. The engine is a diesel engine having a radiator and a cooling fan provided on a front side. A DPF (exhaust gas purification device) purifying engine exhaust gas is arranged at a position rearward and above the diesel engine, and an air cleaner is provided at a position above the diesel engine. The exhaust gas flowing in from a left front side of the DPF is discharged through a short exhaust pipe which extends horizontally further toward the rear of the vehicle from an exhaust outlet on a right rear side of the DPF and opens toward the rear of the vehicle. The shortness of the exhaust pipe discharging the final stage of the exhaust gas is a measure to prevent the vehicle body from increasing in length; however, when the exhaust pipe is insufficiently cooled, exhaust gas having a comparatively high temperature may be discharged from the exhaust outlet. In the riding mower according to Japanese Patent Laid-open Publication No. 2012-026326, the radiator only extends to the height of the air filter, and cooling air that has passed the radiator strikes the air filter or a front wall of the diesel engine and does not flow smoothly toward the rear of the engine compartment.

In a riding mower disclosed in Japanese Patent Laid-open Publication No. 2013-209949, which has a similar format, in order to ensure an adequate length for an exhaust pipe, exhaust gas exiting an exhaust gas purification device flows through an exhaust passage, which extends forward and upward from the exhaust gas purification device, after which the exhaust passage extends forward of and above the exhaust gas purification device in a transverse direction of the vehicle until it passes the diesel engine, and further extends along a side wall of the diesel engine so as to descend toward the front, after which the exhaust passage reverses course and extends rearward along the side wall of the diesel engine to terminate at an exhaust outlet. With such an exhaust pipe layout, space above the rear portion of the engine and space beside a rear half of the engine is occupied by the exhaust pipe. In particular, a flow cross-sectional area of the exhaust pipe close to the exhaust outlet is large, and therefore the required space beside the rear half of the engine is larger. As a result, a width of the hood increases. In the riding mower according to Japanese Patent Laid-open Publication No. 2013-209949, the radiator only extends to the height of the air filter, and cooling air that has passed the radiator strikes the air filter or a front wall of the diesel engine and does not flow smoothly toward the rear of the engine compartment.

In view of the above, an appropriate arrangement of a radiator, air cleaner, and exhaust gas purification device is required in a mower in which a diesel engine is installed.

SUMMARY OF THE INVENTION

A mower according to the present invention includes: a vehicle frame extending in a front-back direction, the vehicle frame being suspended on front wheels on a front side and on rear wheels on a rear side; a mower unit mounted on the vehicle frame; a driver's seat provided to the vehicle frame; a transmission arranged below the driver's seat; a diesel engine arranged rearward of the transmission such that a bottom end of the engine is positioned higher than a bottom end of the transmission; an exhaust gas purification device arranged rearward of the diesel engine and provided with a filter collecting particulate matter contained in exhaust gas discharged from the diesel engine; an air cleaner arranged forward of the exhaust gas purification device and above the diesel engine; and a radiator extending from an area between the transmission and the diesel engine so as to project further upward than the air cleaner through an area between the driver's seat and the air cleaner.

According to this configuration, the radiator is arranged to span from the area between the transmission and the diesel engine through the area between the driver's seat and the diesel engine, and to reach further upward. Moreover, cooling air that has entered from behind the driver's seat and passed above the radiator passes through a vicinity of the air cleaner arranged above the diesel engine. The cooling air that has passed below the radiator passes beside the diesel engine. The exhaust gas purification device is arranged rearward of the diesel engine; therefore, the exhaust gas purification device is not directly exposed to cooling airflow passing over the radiator. In addition, the radiator is raised to a position high above the ground; therefore, a distance between the bottom ends of the transmission and diesel engine and the surface of the ground can be increased effectively, a clearance angle to avoid contact between the rear portion of the vehicle and the ground when climbing a hill or clearing an obstacle is increased, and performance of the mower is improved.

In another aspect of the present invention, the radiator is arranged such that a height-direction center portion of the radiator is positioned at the height of a top surface of a seat cushion of the driver's seat. According to this configuration, airflow is generated in the vicinity of the driver's back when sitting in the driver's seat and fresh air flows into the driver's vicinity. Therefore, a comfortable feeling can be imparted to the driver.

The flow of air passing the radiator and entering the engine compartment, on one hand, cools a surface of the engine while directly striking the diesel engine, and also pushes hot air rising above the diesel engine away to lower a temperature within the engine compartment. In a case where the exhaust gas purification device is installed, high temperatures may be generated while the filter, such as a DPF, is being renewed, and therefore the hot air in the vicinity of the exhaust gas purification device must be pushed away. Therefore, in another aspect of the present invention, the radiator is arranged such that the height-direction center portion of the radiator is at the same position as a boundary region situated between the diesel engine and the air cleaner. Accordingly, cooling of the diesel engine itself, as well as outflow of hot air above the engine and in the vicinity of the exhaust gas purification device, is achieved efficiently. In order to effectively create an air flow passage achieving the cooling of the diesel engine itself, as well as the outflow of hot air above the engine and in the vicinity of the exhaust gas purification device, in another aspect of the present invention, a hood is provided covering the radiator, the diesel engine, the air cleaner, and the exhaust gas purification device; and an air intake opening is formed on a front wall of the hood facing a cooling surface of the radiator. Thus, a cooling air passage is formed passing from a space between a seat back of the driver's seat and the front wall, past a top half of the radiator, the air cleaner, and the exhaust gas purification device.

In the case of a mower, a great deal of debris such as grass clippings is present in an area having a low height above the ground. Therefore, the cooling airflow is preferably guided in from as high an area as possible. In addition, the driver's seat is attached at a position slightly elevated by a seat attachment base provided to the vehicle frame. The seat attachment base therefore becomes an obstacle, making it difficult to guide a large amount of air from an area below the driver's seat. Due to configuration characteristics peculiar to such a mower, in order to efficiently guide cooling airflow into the engine compartment, in another aspect of the present invention, a bottom end of the air intake opening on the front wall is positioned at a height position of the top surface of the seat cushion of the driver's seat.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
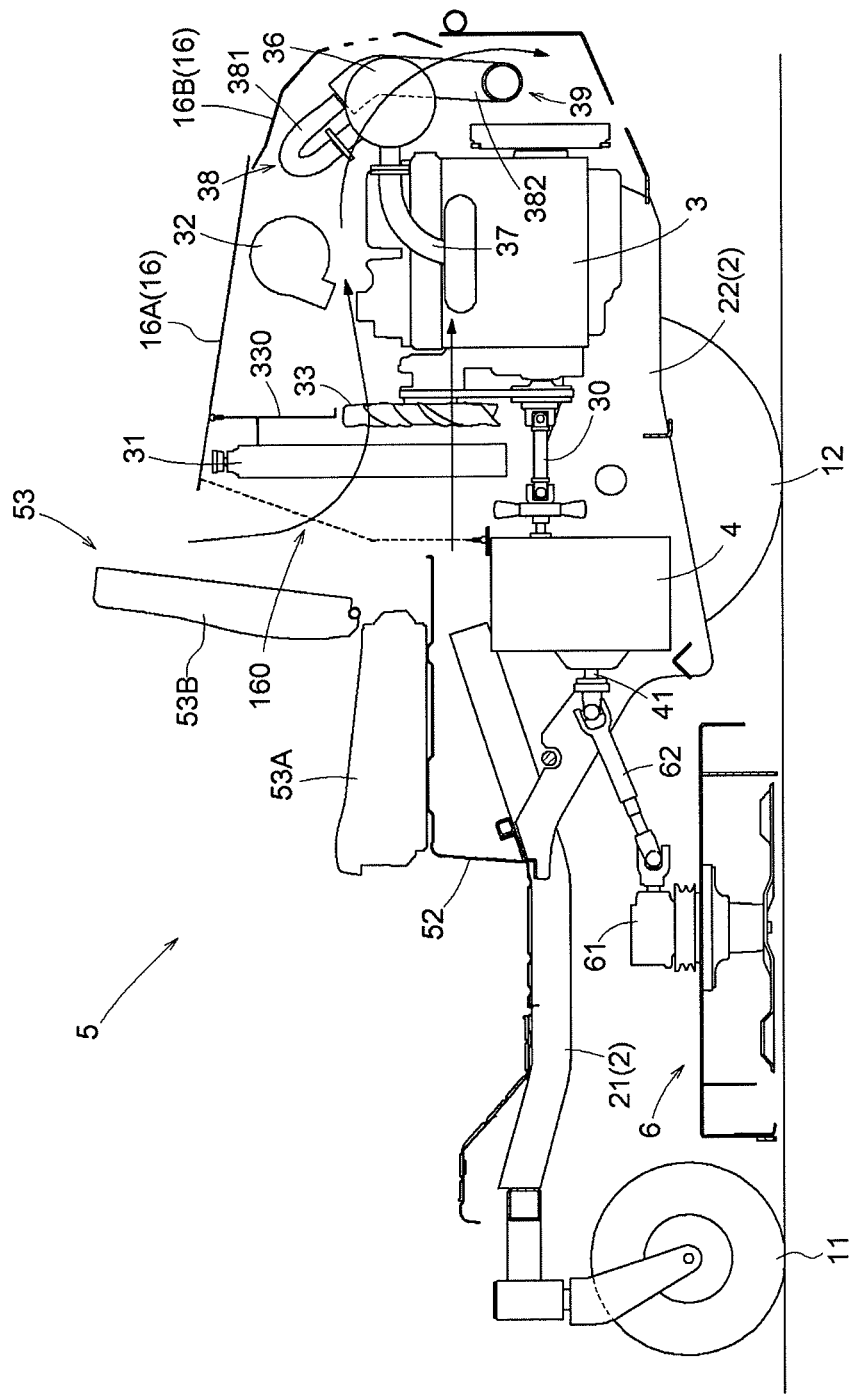
FIG. 1 is a schematic side view illustrating a basic cooling structure of an engine compartment employed by a work vehicle according to the present invention.

Before describing a specific embodiment of a mower according to the present invention in which a diesel engine (hereafter referred to simply as an engine) is mounted, a basic arrangement of a radiator 31, an air cleaner 32, and an exhaust gas purification device 36 in an engine compartment covered by a hood 16 is described with reference to FIG. 1. The mower shown in FIG. 1 is rendered schematically, illustrating only a vehicle frame 2 extending in a front-back direction of the vehicle, a front wheel unit 11, a rear wheel unit 12, a driver's seat 53 configured by a seat cushion 53A and a seat-back 53B, a mower unit 6, a transmission 4, the diesel engine (hereafter referred to simply as the engine) 3, and engine peripheral components. The engine peripheral components include the radiator 31, the air cleaner 32, a cooling fan 33, and the exhaust gas purification device 36. Exhaust gas is expelled to a vehicle exterior through a discharge opening on an exhaust end portion 39. An exhaust manifold of the engine 3 and an inlet of the exhaust gas purification device 36 are connected by an inlet-side exhaust passage 37, while an outlet of the exhaust gas purification device 36 and the exhaust end portion 39 are connected by an outlet-side exhaust passage 38. As a rule, in the present description, a front-back direction refers to a longitudinal direction (travel direction) of the mower; a lateral direction (left-right direction) refers to a width direction of the mower (i.e., a direction orthogonal to the front-back direction); and a vertical direction refers to a direction perpendicular to the ground (horizontal plane).

The driver's seat 53 is arranged above a center region of the vehicle frame 2, and the transmission 4 is arranged below and rearward of the driver's seat 53. A rear wheel axle of the rear wheel unit 12 extends in a transverse direction of the vehicle from a position rearward of the transmission 4. The engine 3 is arranged rearward of the transmission 4, and at a position higher (height above the ground) than a bottom end of the transmission 4. Accordingly, on the vehicle frame 2, the height above the ground of a bottom end portion where the engine 3 is mounted is higher than the height above the ground of the bottom end portion where the transmission 4 is mounted. This increases an allowable distance before the rear portion of the vehicle body contacts the ground when the front wheel unit 11 is raised, and improves an ability of the vehicle body to clear obstacles.

The exhaust gas purification device 36 is arranged rearward of the engine 3, at substantially the same height as the engine 3. The exhaust gas purification device 36 includes a substantially cylindrical housing having substantially the same length as the engine 3 in the transverse direction of the vehicle, and is fixated to the vehicle frame 2 such that a cylinder axis of the housing follows the transverse direction of the vehicle. The air cleaner 32, which similarly includes a substantially cylindrical housing, is positioned above the engine 3 and at substantially a center position of the front-back direction length of the engine 3, such that the cylinder axis of the housing follows the transverse direction of the vehicle.

The radiator 31 is oriented so as to be substantially upright and is arranged in an area between the transmission 4 and the engine 3. A bottom end of the radiator 31 is positioned directly above an input shaft 30 that is coupled to a crank shaft so as to transmit drive force from the engine 3 to the transmission 4, and a top end of the radiator 31 projects further upward than the air cleaner 32. As shown in FIG. 1, in the lateral view of the mower, a height direction center portion of the radiator 31 is positioned at the height of a top surface of the seat cushion 53A of the driver's seat 53. The height direction center portion of the radiator 31 is substantially the same height as a boundary region situated between the engine 3 and the air cleaner 32.

The cooling fan 33, which has a rotation axis extending in the front-back direction of the vehicle, is provided to an upper portion of a front wall of the engine 3 and takes in outside air via a cooling surface of the radiator 31. For purposes of clarity, FIG. 1 omits a depiction of a shroud provided between the radiator 31 and the cooling fan 33. An air intake opening 160 is formed on a front wall of the hood 16, with the front wall facing the cooling surface of the radiator 31. The hood 16 covers the engine 3, the radiator 31, the air cleaner 32, and the exhaust gas purification device 36. A dust net is hung across the air intake opening 160. A bottom end of the air intake opening 160 is positioned at about a height position of the top surface of the seat cushion 53A of the driver's seat 53, i.e., at a height direction center portion of the radiator 31. A space is formed between the seat back 53B of the driver's seat 53 and the front wall of the hood 16 where air is able to circulate freely, and a cooling air pathway (shown by arrows in FIG. 1) is created that flows past the top half of the radiator 31, the air cleaner 32, and the exhaust gas purification device 36.

A line linking the top ends of the air cleaner 32 and the exhaust gas purification device 36 descends toward the rear, and therefore a top panel of the hood 16 is inclined in a similar shape. Cooling air running past the top half of the radiator 31 flows along the top panel of the hood 16 and obliquely downward, and is drawn downward in the area of the rear wall of the hood 16. Accordingly, when an exhaust pipe, which releases exhaust gas exiting the exhaust gas purification device 36 to the outside air, is exposed to the flow of cooling air, there is a favorable cooling effect.

Figure 2:
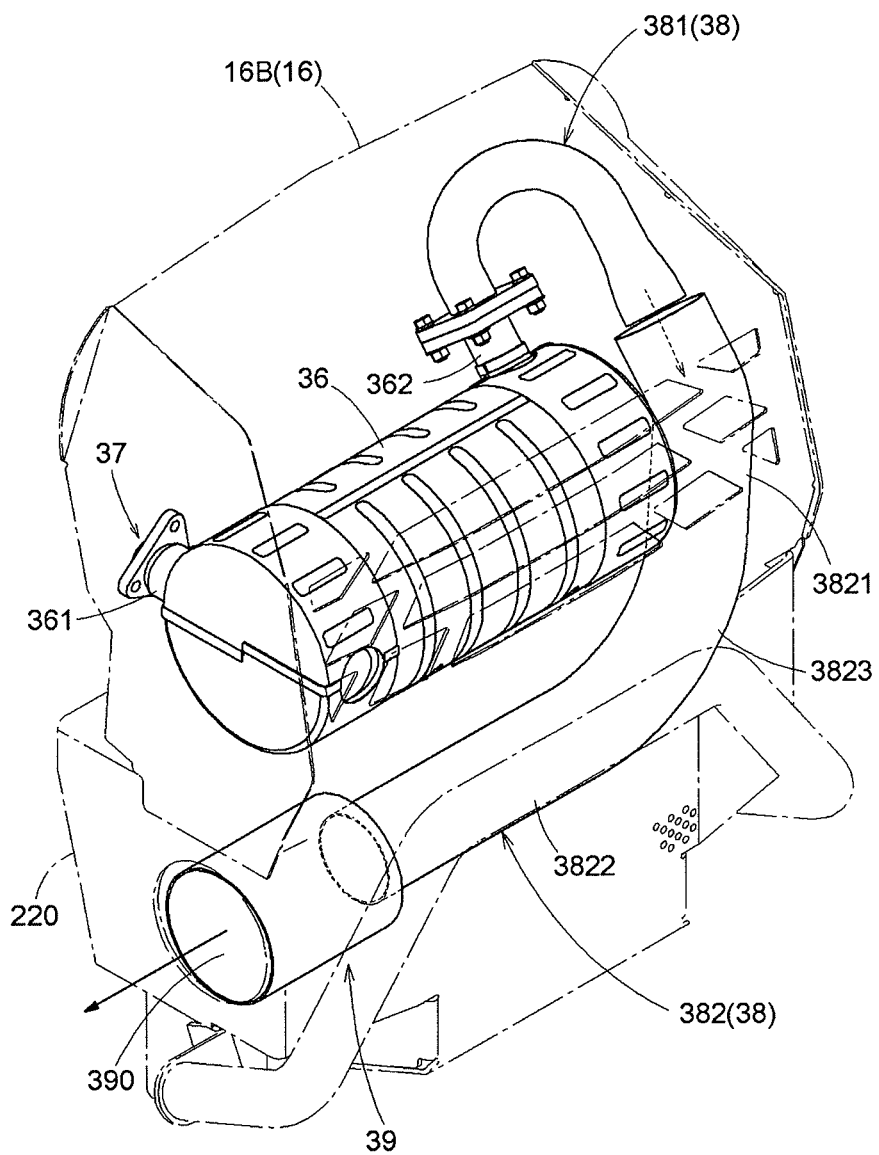
FIG. 2 is a perspective view illustrating an arrangement of an exhaust gas purification device and an exhaust passage in a rear portion of an engine hood.

Next, an exemplary layout of the exhaust pipe from the exhaust gas purification device 36 is described with reference to FIG. 2. The outlet of the exhaust gas purification device 36 and the exhaust end portion 39 are connected. The outlet-side exhaust passage 38 is configured by a first exhaust passage 381 and a second exhaust passage 382. The first exhaust passage 381 is an exhaust circulation passage coupled to the outlet of the exhaust gas purification device 36 and passing over the exhaust gas purification device 36 to reach beside a first end portion of the exhaust gas purification device 36 (in FIGS. 1 and 2, a right side of the vehicle). The first exhaust passage 381 extends through a position higher than a top end of the engine 3. The second exhaust passage 382 is an exhaust circulation passage coupled to the first exhaust passage 381 and extending in the transverse direction from beside the first end portion of the exhaust gas purification device 36, below the exhaust gas purification device 36, to the exhaust end portion 39.

A flow cross-sectional area of the second exhaust passage 382 is larger than the flow cross-sectional area of the first exhaust passage 381, and a gap in the transverse direction is formed at the connection between the first exhaust passage 381 and the second exhaust passage 382 such that outside air flows into the second exhaust passage 382 together with exhaust gas from the first exhaust passage 381. Moreover, the second exhaust passage 382 is configured by a downward portion 3821 extending downward beside the first end portion of the exhaust gas purification device 36; a sideways portion 3822 extending horizontally in a straight line below the exhaust gas purification device 36; and a two-dimensional bend portion 3823 coupling the downward portion 3821 and the sideways portion 3822. In the example shown in FIG. 2, the downward portion 3821, the sideways portion 3822, and the two-dimensional bend portion 3823 are integrally formed. The exhaust end portion 39, which is connected substantially coaxially to a terminal end of the sideways portion 3822, is a cylindrical body. The discharge opening formed on the terminal end of the exhaust end portion 39 is oriented in the transverse direction of the vehicle.

The engine hood 16 which delineates the engine compartment is configured by a front hood 16A covering the radiator 31, the cooling fan 33, and the engine 3; and a rear hood 16B covering the exhaust gas purification device 36 and the outlet-side exhaust passage 38. The rear hood 16B serves as a downward deflection plate such that, after cooling air from the cooling fan 33 passes over the engine 3, the cooling air passes behind the exhaust gas purification device 36 to arrive below the exhaust gas purification device 36.

Figure 3:
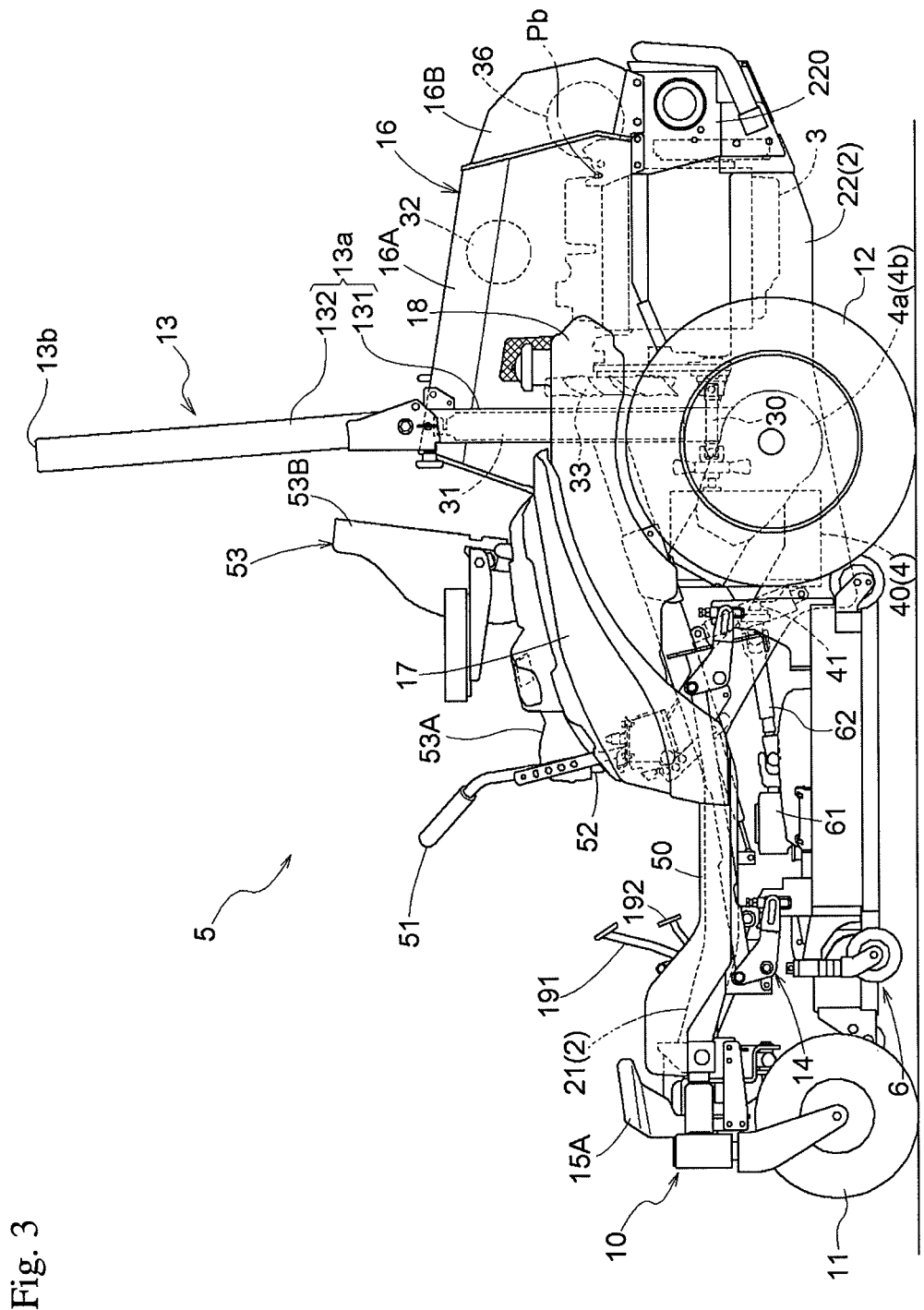
FIG. 3 is a side view of a zero turn mower according to an embodiment of the present invention.
Figure 4:
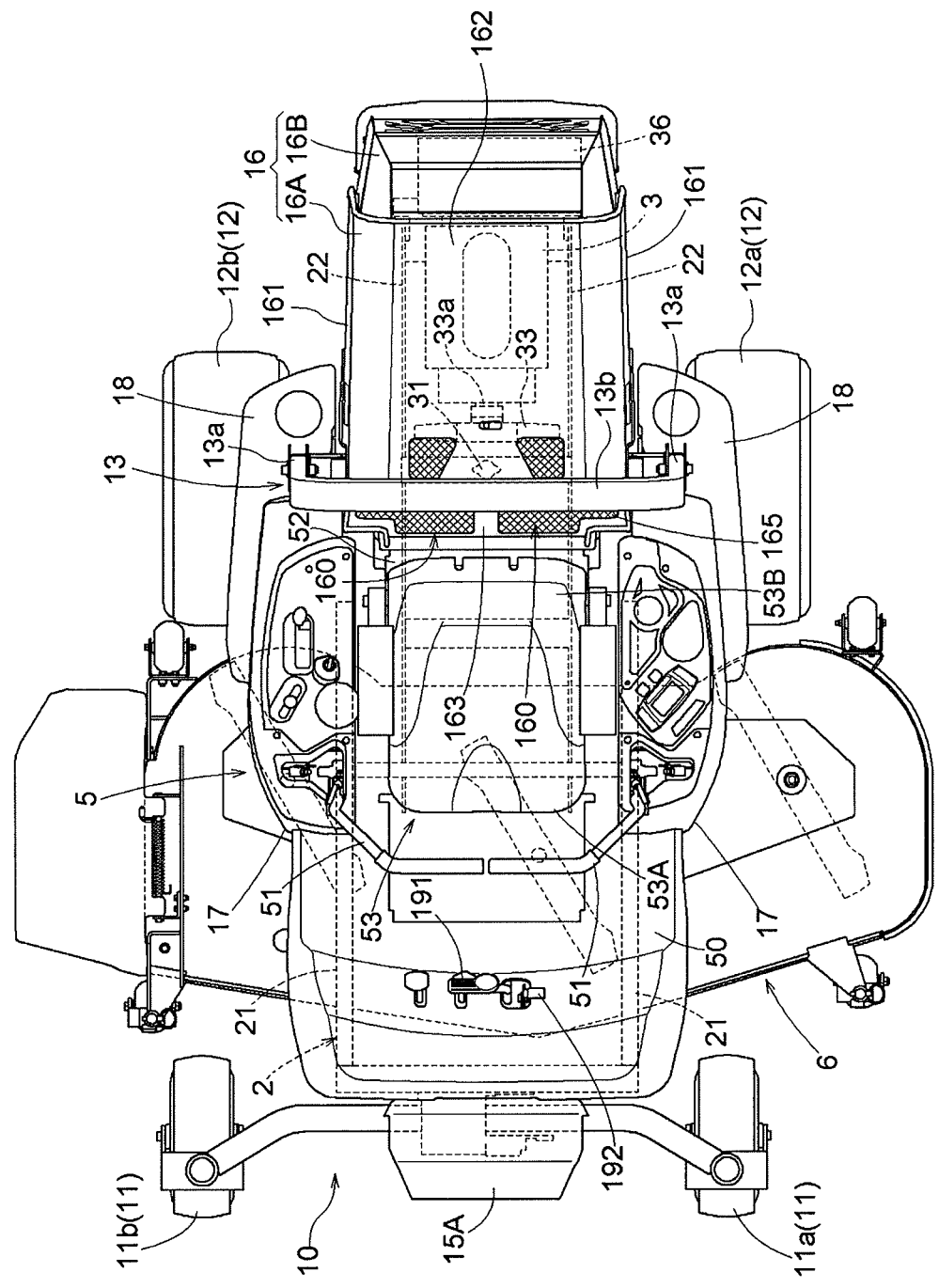
FIG. 4 is a top or plan view of the zero-turn mower.

Next, a specific embodiment of a riding mower according to the present invention is described with reference to the drawings. In the present embodiment, a structure and arrangement are employed basically as described with reference to FIGS. 1 and 2. FIGS. 3 and 4 show side and top views of a mower known as a zero-turn mower and is one example of a riding mower. As illustrated in FIGS. 3 and 4, the mower is provided with a traveling vehicle body 10 which is supported on the ground by the front wheel unit, which includes the pair of left and right front wheels 11, and by the rear wheel unit, which includes the pair of rotationally driven left and right rear wheels 12. The traveling vehicle body 10 includes the vehicle frame 2 as a base member, and the mower unit 6 is suspended from the vehicle frame 2 between the front wheels 11 and the rear wheels 12 via a linking mechanism 14. An operation portion 5 is arranged in the center region of the traveling vehicle body 10 in the front-back direction of the vehicle. Therefore, in the operation portion 5, a seat support 52 is mounted on top of the vehicle frame 2 (see FIG. 1) and the driver's seat 53 is provided to a top surface of the seat support 52. The driver's seat 53 is configured by the seat cushion 53A, which holds or supports the driver's buttocks; and the seat back 53B, which holds or supports the back of the driver. Further, fenders 17 are formed on left and right side surfaces of the seat support 52. Finally, a step 50 is laid or located in front of the driver's seat 53.

A ROPS apparatus 13 is provided to the rear part of the operation portion 5. The engine 3 is arranged at the rear end region of the traveling vehicle body 10 and the transmission 4 is arranged in front of and slightly lower than the engine 3. The transmission 4 includes a left rear-axle transmission portion 4a and a right rear-axle transmission portion 4b. Although only the left rear-axle transmission portion 4a is depicted in FIG. 3 using a dotted line, the right rear-axle transmission portion 4b is arranged at a position axially symmetric with the left rear-axle transmission portion 4a on the right side of the vehicle. The left rear-axle transmission portion 4a and the right rear-axle transmission portion 4b each have a built-in hydrostatic transmission (HST, an example of a continuously variable transmission), which may each be operated independently. The hydrostatic transmission can continuously vary the speed from low to high while the engine output is in normal rotation. This includes forward or reverse rotation (backward) and the transmitting of the drive power of the engine to each of the left and right rear wheels 12a and 12b of the rear wheel unit. Thereby, both the left and the right rear wheels 12a and 12b may be driven in a forward direction at the same or substantially the same speed to initiate straight line forward travel, and both the left and the right rear wheels 12a and 12b may be driven in a backward direction at the same or substantially the same speed to initiate straight line backwards travel. The traveling vehicle body 10 can be made to turn in an arbitrary direction by ensuring the speeds of the left and the right rear wheels 12a and 12b are different from each other; for example, operating one of the left or right rear wheels 12a or 12b at a low speed near zero and operating the other of the rear wheels 12a and 12b forward or backward at a high speed can cause the traveling vehicle body 10 to make a small turn. Additionally, driving the left and the right rear wheels 12a and 12b in mutually opposite directions can cause the traveling vehicle body 10 to perform a spinning turn about a turning center that is substantially the center portion between the left and right rear wheels 12a and 12b. The front wheel unit is configured by a left-right pair of caster wheels, and can change orientation freely about a vertical axis center. Thus, the front wheel unit is capable of correcting the orientation of the traveling vehicle in accordance with the travel direction, which is defined by how the left and right rear wheels 12 are driven.

A speed change operation on the transmission 4, and in particular a speed change operation on the left rear-axle transmission portion 4a and the right rear-axle transmission portion 4b, is carried out using a pair of left and right speed change levers 51 arranged on both sides of the driver's seat 53. When the speed change levers 51 are held at a front-back direction neutral position, the continuously variable transmission is in a neutral stop. When the speed change levers 51 are moved forward or rearward from the neutral position, a forward speed change or a backward speed change, respectively, occurs.

As shown in FIG. 4, the vehicle frame 2 of the traveling vehicle body 10 is configured by a front frame 21 that is broad in width and a rear frame 22 that is narrow in width. The front frame 21 and the rear frame 22 are configured by a left-right pair of vertical beams extending in the front-back direction of the vehicle, and by a crossbeam linking the vertical beams. The width of the front frame 21 (space between the left and right vertical beams) is greater than that of the rear frame 22, and a front portion of the rear frame 22 fits inside a rear portion of the front frame 21 as seen in a plan view. The front portion of the rear frame 22 is coupled to the rear portion of the front frame 21 by a coupling member (not shown in the drawings). A box-shaped rear end frame 220 is fixated to the rear end of the rear frame 22 so as to create a space to the rear of the engine 3.

The engine 3 is installed in the middle of the rear frame 22 and is isolated from vibration. An input shaft 30 extends substantially horizontally, coaxially with an extended portion of a crank shaft protruding forward from a lower portion of the front wall of the engine 3, the input shaft 30 transmitting drive power from the engine to the transmission 4. In order to permit the greatest possible lifting of the left and right front wheels 11a and 11b, the height of the rear portion of the traveling vehicle body 10 above the ground must be raised. Therefore, the engine 3 is arranged in a higher position off the ground than the transmission 4. A PTO shaft 41 (see FIG. 1), which transmits drive power to the mower unit 6, projects forward from the front wall of the transmission case 40 of the transmission 4. The height of the transmission 4 above the ground is low so as to not increase an angle of inclination of a PTO intermediate shaft 62, which connects the PTO shaft 41 and the PTO input 61 of the mower unit 6.

The cooling fan 33 is arranged forward of the engine 3 such that a top end of the cooling fan 33 is at substantially the same height as the top end of the engine 3. The cooling fan 33 includes a rotation shaft 33a (see FIG. 5) provided to a top portion of the front wall of the engine 3, the rotation shaft 33a extending in the front-back direction and transmitting drive power from the extended portion of the crank shaft with a belt transmission. The radiator 31 is arranged forward of the cooling fan 33. The radiator 31 is provided in an upright posture (i.e., extending in a perpendicular direction) such that the cooling surface of the radiator 31 faces a rotation trajectory plane of the cooling fan 33. A bottom end of the radiator 31 is adjacent to the input shaft 30, and the height of the bottom end is located at substantially a middle height between the top end of the transmission 4 and the input shaft 30. A shroud 330 is formed between the cooling fan 33 and the radiator 31. As shown in FIGS. 6 and 7, left and right side portions of the shroud 330 extend up to side panels of the hood 16 and act as a dividing wall separating the engine compartment into an engine space and a radiator space.

Figure 7:
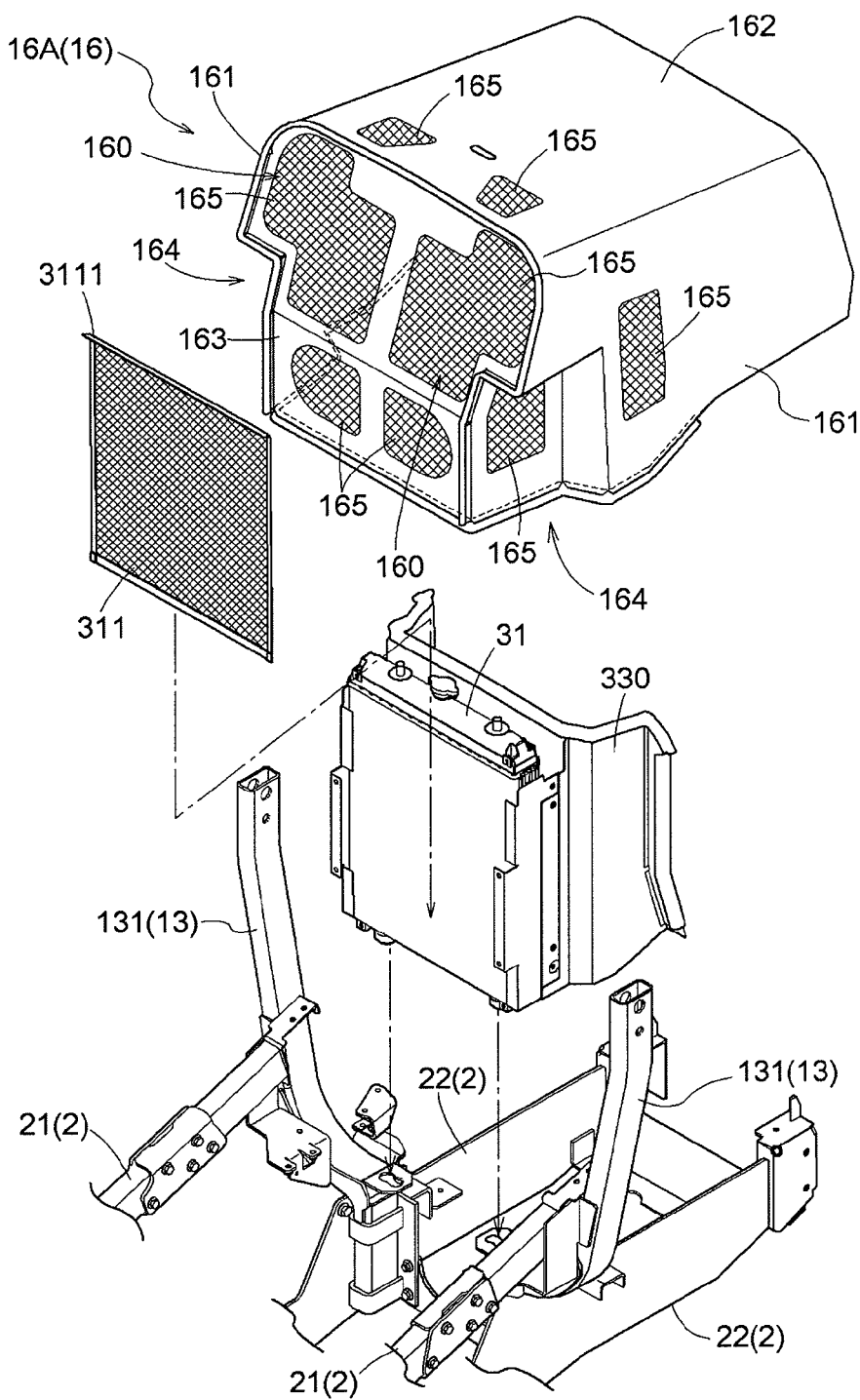
FIG. 7 is an exploded perspective view of a rear frame, a radiator, and the hood.
Figure 8:
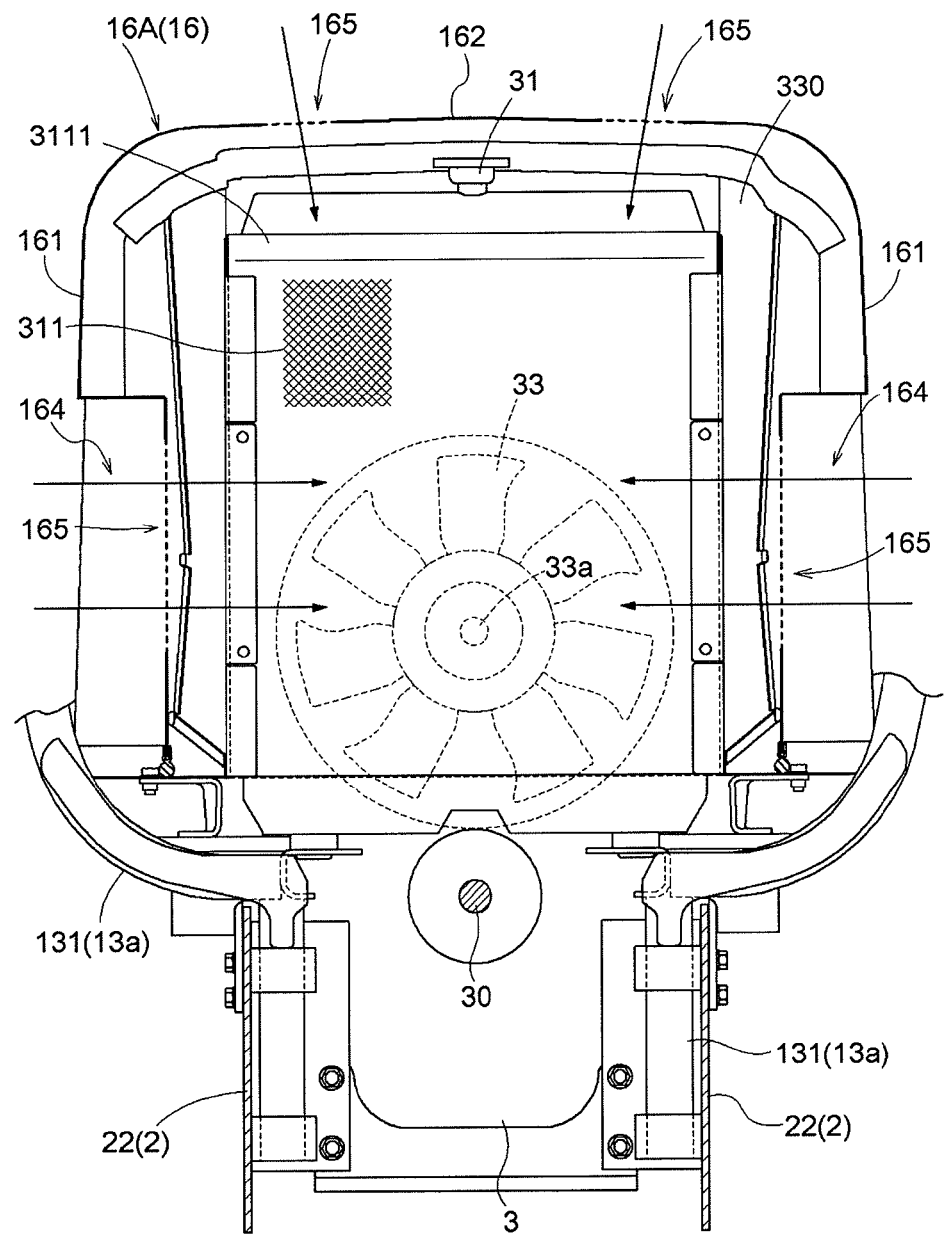
FIG. 8 is a front view of an area around the radiator.

As shown in FIG. 3, the hood 16 delineating the engine compartment is configured by a fixed hood 16B and a movable hood 16A, the fixed hood 16B being the rear hood fixated to the rear end frame 220 and the movable hood 16A being the front hood opening and closing around an open-close axis center Pb, which extends horizontally in the transverse direction of the vehicle. As shown in FIG. 7, the movable hood 16A is open on a rear surface, and is configured by a left-right pair of side panels 161 forming side surfaces; a top panel 162 forming a top surface; and a front panel 163 forming a front surface. A plurality of openings 165 are provided across the entire front panel 163, as well as on a front end region of the side panels 161 and the top panel 162. The dust net is mounted to the openings 165. A rectangular recessed portion 164 is formed on a lower half of the front side of the side panels 161, and a dust net-covered opening 165 is also provided to a side wall (side surface or top surface) of the recessed portion 164. Accordingly, as shown in FIG. 8, the cooling fan 33 can take in air through the top surface and side surfaces of the movable hood 16A to create a cooling airflow.

The front panel 163 of the movable hood 16A is bent in a lateral direction crease. When the movable hood 16A is in a closed state, the lower half of the front panel 163 forms a perpendicular surface, whereas the upper half of the front panel 163 forms an inclined surface inclining toward the rear. As clearly shown in FIG. 5, an airflow space is formed between the front panel 163 of the closed movable hood 16A and the occupied seat back 53B, and essentially, a horizontal cross-sectional area of the airflow space progressively increases further upward. By driving the cooling fan 33, the cooling airflow taken in through the airflow space passes over the radiator 31 and flows into the area around the engine 3. The cooling airflow strikes the front wall and flows into a space above the engine 3.

A dust cover 311 is also mounted to the front surface of the radiator 31. A material that is finer than the dust cover is arranged to cover to the openings 165 is used as the mesh of the dust cover 311. The dust cover 311 is bent such that a top end thereof acts as a handle 3111. The dust cover 311 is mounted to the radiator 31 so as to be capable of being pulled upward. Accordingly, when the dust cover 311 is to be removed, a hand reaches in from above, grips the handle 3111, and pulls the dust cover 311 upward. The handle 3111 is not bent at a 90° angle, but rather is bent at a somewhat gentler angle, such as 70°, to facilitate gripping.

The cylindrical air cleaner 32 lies horizontally (such that a cylinder axis lies along the transverse direction of the vehicle) above the engine 3. An inflow pipe 331 of the air cleaner 32 extends upward at a slight angle from the air cleaner 32 and runs through a top portion of the shroud 330. An intake opening 320 of the inflow pipe 331 reaches a top end of the radiator 31 in the radiator space. An outflow pipe 332 of the air cleaner 32 extends downward, bending in a "U" shape, and connects to an intake manifold of the engine 3. The height of the bottom end of the radiator 31 is substantially the height of the crank shaft, and the height of the top end of the radiator 31 is substantially the height of the intake opening 320 of the air cleaner 32. In other words, the radiator 31 extends so as to project upward through a region between the driver's seat 53 and the air cleaner 32, higher than the top end of the air cleaner 32.

Figure 5:
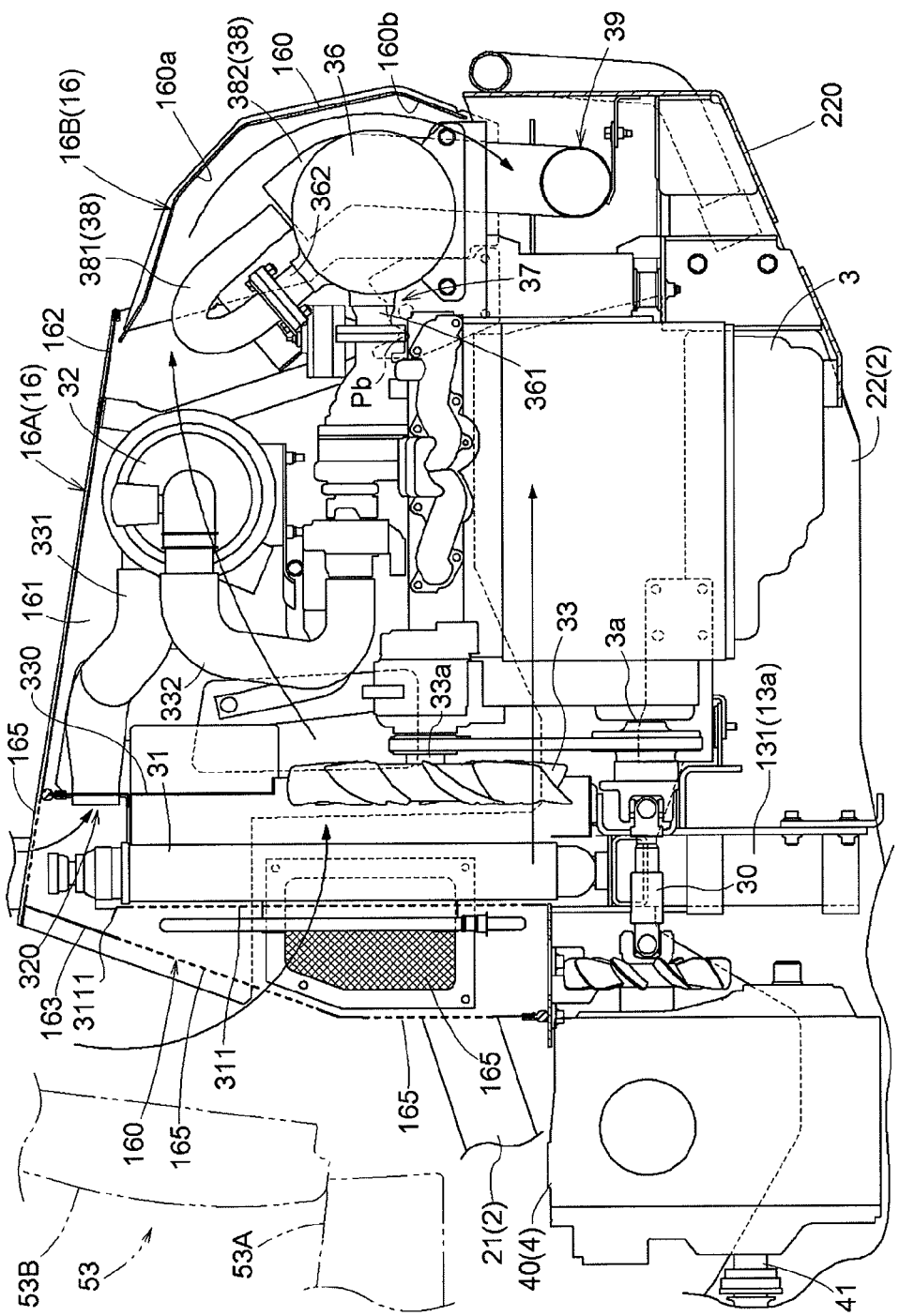
FIG. 5 is a side view of the engine compartment.
Figure 6:
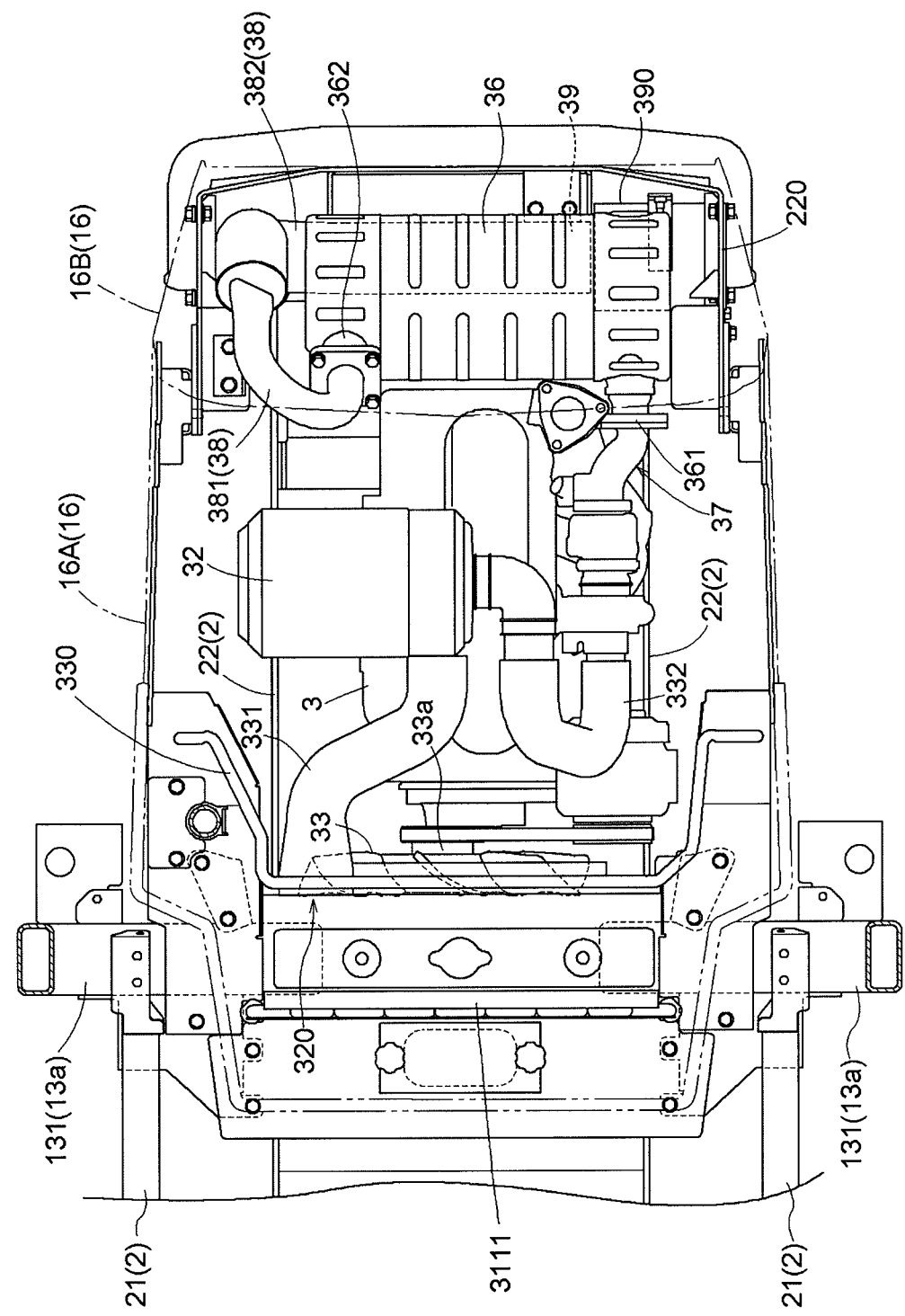
FIG. 6 is a top or plan view of the engine compartment.

As shown in FIGS. 5 and 6, the exhaust gas purification device 36, which has substantially a cylindrical shape, is arranged to the rear of the engine 3 and lying horizontally (such that the cylinder axis lies along the transverse direction of the vehicle) and substantially at the height of the engine 3. A filter called a DPF is installed in the exhaust gas purification device 36, with the DPF collecting particulate matter contained in the exhaust gas discharged from the engine 3. The exhaust gas purification device 36 is interposed in the exhaust pipe system of the engine 3. The exhaust pipe system is configured by the exhaust end portion 39 forming a discharge opening 390 expelling exhaust gas to the vehicle exterior; with the inlet-side exhaust passage 37 connecting the exhaust manifold of the engine 3 and an inlet 361 of the exhaust gas purification device 36; and the outlet-side exhaust passage 38 connecting an outlet 362 of the exhaust gas purification device 36 and the exhaust end portion 39.

Figure 9:
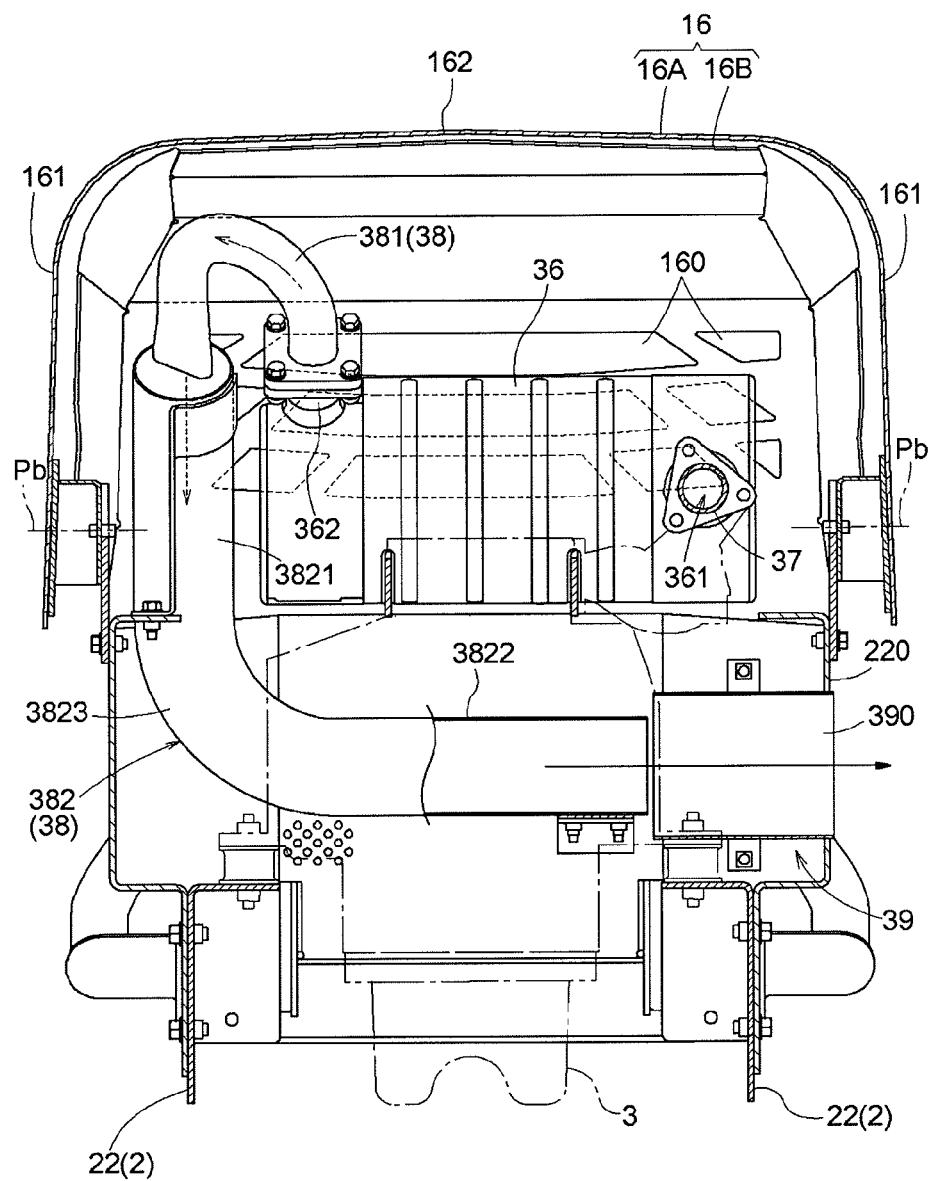
FIG. 9 is a back view of an area around the exhaust gas purification device.
Figure 10:
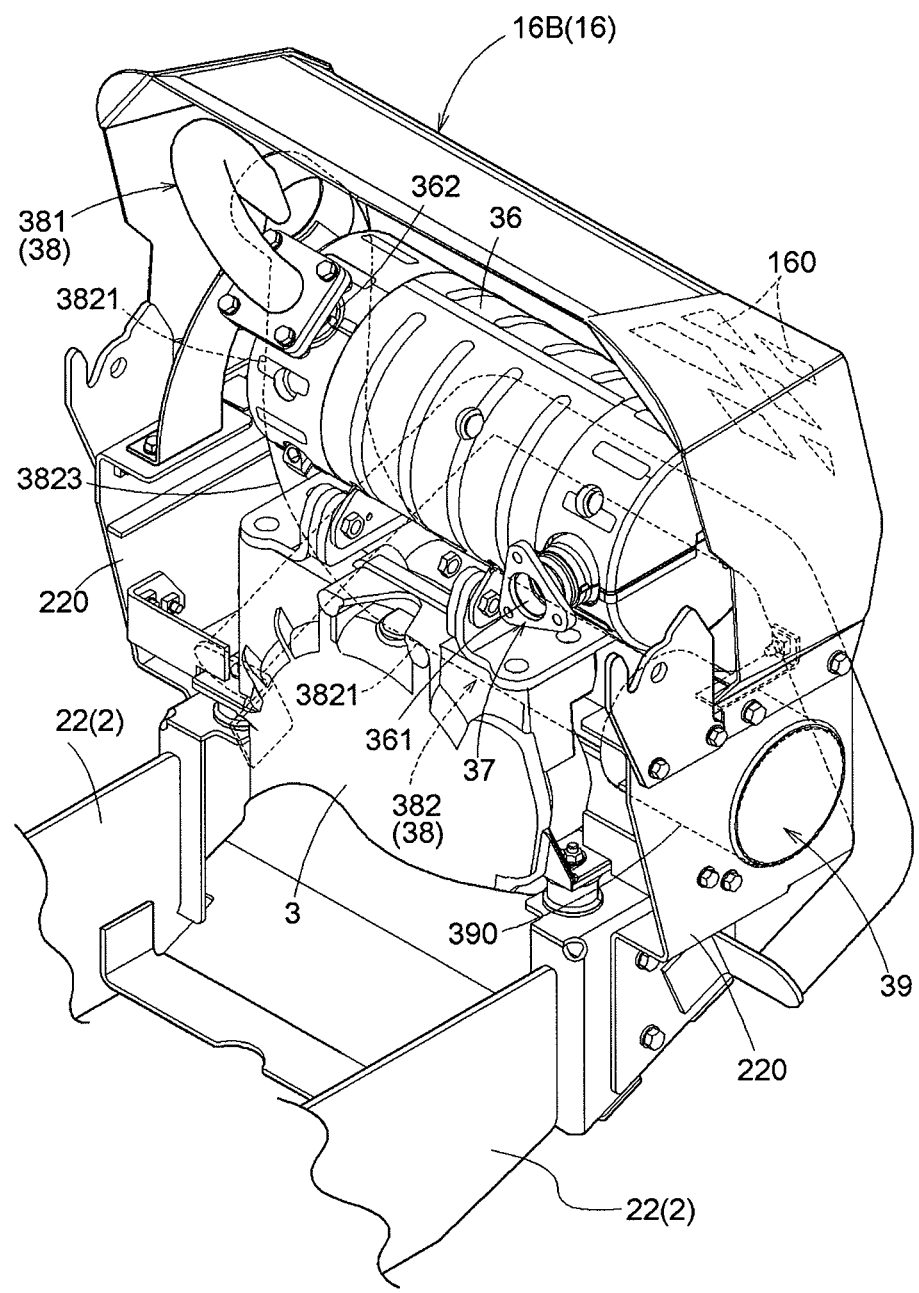
FIG. 10 is a perspective view of the area around the exhaust gas purification device.

As clearly shown in FIGS. 9 and 10, the outlet-side exhaust passage 38 is configured by the first exhaust passage 381 and the second exhaust passage 382. A projecting end of the first exhaust passage 381 is coupled to the outlet 362 of the exhaust gas purification device 36. The first exhaust passage 381 rises from the outlet 362 at a forward angle above the exhaust gas purification device 36, then bends into a U-turn shape, a terminal end of which extends to be beside the right-side end of the exhaust gas purification device 36. A projecting end of the second exhaust passage 382 is coupled to the first exhaust passage 381. In the present embodiment, the coupling of the first exhaust passage 381 to the second exhaust passage 382 is a coupled state where the terminal end of the first exhaust passage 381, which is formed to have a diameter greater than the first exhaust passage 381, is either inserted into the projecting end of the second exhaust passage 382, or is positioned substantially coplanar with or spaced slightly apart from the projecting end of the second exhaust passage 382, thereby creating a gap between the two members through which the cooling airflow enters. The second exhaust passage 382 is configured by the downward portion 3821, which has substantially a straight line shape and runs beside the right-side end portion of the exhaust gas purification device 36; the sideways portion 3822 extending in the transverse direction of the vehicle below the exhaust gas purification device 36 to reach the exhaust end portion 39; and the 90° bend portion 3823 coupling the downward portion 3821 and the sideways portion 3822. The bend portion 3823 is formed as a two-dimensional bent path, the center axis of which is positioned on a two-dimensional plane. The coupling of the second exhaust passage 382 to the exhaust end portion 39 is also a coupled state where the terminal end of the second exhaust passage 382 is either inserted into the exhaust end portion 39, which is formed to have a diameter greater than the second exhaust passage 382, or is positioned substantially coplanar with or spaced slightly apart from the exhaust end portion 39, thereby creating a gap between the two members through which the cooling airflow enters.

As clearly shown in FIG. 5, a sectional face of the interior surface of the fixed hood 16B, as seen in a side view, has a shape that follows a rearward, side view outline of the exhaust gas purification device 36, the first exhaust passage 381, and the second exhaust passage 382. In other words, the interior surface of the fixed hood 16B acts as a downward deflection plate oriented such that the cooling air that has passed through or around the air cleaner 32 moves from the first exhaust passage 381 behind the exhaust gas purification device 36 to arrive below the exhaust gas purification device 36. In the present embodiment, a first deflection plate 160a causing the cooling air to flow downward and rearward is provided to the interior of the top portion of the fixed hood 16B, and a second deflection plate 160b causing the cooling air to flow downward and forward is provided to the interior of the bottom portion of the fixed hood 16B.

As shown in FIGS. 3 and 7, the ROPS 13 includes a left-right pair of supporting columns 13a and a horizontal member 13b connecting the supporting columns 13a. The supporting columns 13a can pivot to bend in the middle. A leg 131, which is the lower half of the supporting column 13a, curves inward at substantially the same height position as the top end of the rear frame 22, and extends until reaching the rear end of the front frame 21. The rear end of the front frame 21 and the leg 131 of the ROPS 13 are coupled via a coupling bracket. A straight-line support column 132, which is the upper half of the support column 13a, is coupled to the leg 131 via a pivoting coupler so as to be capable of pivoting between a vertical posture and a sideways (or downward) posture.

The step 50 is mounted to the front frame 21 in a foot area of the driver's seat 53. The fenders 17 are provided on the left and right of the driver's seat 53, and fuel tanks 18 are provided below each of the fenders 17. A brake pedal 191 is arranged close to the center of a front region of the step 50. A brake lock pedal 192 for parking, which holds the brake pedal 191 in a depressed position, is provided beside the brake pedal 191.

Other Embodiments (1) In the specific embodiment described above, a zero-turn mower is exemplified as the mower. However, the present invention can also be utilized on a different mower such as a front mower, in which the mower unit 6 is mounted forward of the front wheels 11.

(2) In the specific embodiment described above, the hood 16 was divided into a front hood (the movable hood 16A) and a rear hood (the fixed hood 16B). Instead, both sections may be movable hoods, or the hood 16 may be configured as an undivided, single member.

(3) In the specific embodiment described above, the first deflection plate 160a and the second deflection plate 160b were formed on the interior of the top portion of the fixed hood 16B. However, the deflection plates may be formed as components of the fixed hood 16B, or as separate components. In addition, instead of two deflection plates, a configuration may be employed which creates an effect deflecting cooling air with a single component, or with three or more components.

The present invention can be applied to a work vehicle having a diesel engine installed in a rear portion of a vehicle frame.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A mower comprising:
   a vehicle frame extending in a front-back direction and being suspended on front wheels and rear wheels;
   a mower unit mounted on or to the vehicle frame;
   a driver's seat arranged on the vehicle frame;
   a transmission arranged at least partially below the driver's seat;
   a diesel engine located behind the transmission such that a bottom of the engine is positioned higher than a bottom of the transmission;
   an exhaust gas purification device arranged on a location behind the diesel engine and being configured to collect particulate matter contained in exhaust gas discharged from the diesel engine;
   an air cleaner arranged at a location in front of the exhaust gas purification device and above the diesel engine, wherein the air cleaner includes an inflow pipe having an air intake opening; and
   a radiator located in a radiator space in an area between the transmission and the diesel engine and having an upper end disposed at a higher position than the air cleaner,
   wherein the air intake opening of the inflow pipe reaches a top end of the radiator in the radiator space.

2. The mower according to claim 1, wherein the radiator has a lower end disposed below an upper end of the transmission.

3. The mower according to claim 1, wherein the upper end of the radiator is arranged adjacent each of:
   an air inlet arranged on a hood; and
   the air intake opening coupled to the air cleaner.

4. The mower according to claim 1, wherein the radiator is arranged between the driver's seat and the air cleaner.

5. The mower according to claim 1, wherein the exhaust gas purification device comprises a filter collecting particulate matter.

6. The mower according to claim 1, wherein a vertical center of the radiator is arranged at substantially a same height as a top surface of a seat cushion of the driver's seat.

7. The mower according to claim 1, wherein a vertical center of the radiator is arranged at substantially a same height as a region arranged above the diesel engine and below the air cleaner.

8. The mower according to claim 1, further comprising a hood configured to cover the radiator, the diesel engine, the air cleaner, and the exhaust gas purification device.

9. The mower according to claim 8, wherein the hood comprises an air intake opening located on a front wall of the hood facing a cooling surface of the radiator.

10. The mower according to claim 8, wherein the hood is spaced from the driver's seat so as to define an air space from which cooling air can be drawn into the hood and through a top half of the radiator so as to providing cooling air for cooling that passes around the air cleaner and the exhaust gas purification device.

11. The mower according to claim 1, further comprising a hood having a front wall and an air opening located at a position above a top surface of a seat cushion of the driver's seat.

12. A mower comprising:
   a vehicle frame extending in a front-back direction and being suspended on front wheels and rear wheels;
   a mower unit mounted on or to the vehicle frame;
   a driver's seat arranged on the vehicle frame;
   a transmission;
   a diesel engine located behind the transmission such that a bottom of the engine is positioned higher than a bottom of the transmission;
   an exhaust gas purification device arranged on a location behind the diesel engine and being configured to collect particulate matter contained in exhaust gas discharged from the diesel engine;
   an air cleaner arranged at a location in front of the exhaust gas purification device and above the diesel engine;
   a radiator in a radiator space located in front of the diesel engine;

one or more air inlets configured to allow external air to enter into the air cleaner, the one or more air inlets including an inflow pipe of the air cleaner having an air intake opening; and one or more additional air inlets configured to allow external air to pass through an upper portion of the radiator, wherein the air intake opening of the inflow pipe reaches a top end of the radiator in the radiator space.

13. The mower according to claim 12, wherein the radiator has a lower end disposed below an upper end of the transmission.

14. The mower according to claim 12, wherein an upper end of the radiator is arranged adjacent each of:
an upper wall of a hood; and
a front inclined wall of the hood.

15. A mower comprising:
a vehicle frame extending in a front-back direction and being suspended on front wheels and rear wheels;
a mower unit mounted on or to the vehicle frame;
a driver's seat arranged on the vehicle frame;
a transmission;
a diesel engine located behind the transmission such that a bottom of the engine is positioned higher than a bottom of the transmission;
an exhaust gas purification device arranged on a location behind the diesel engine and being configured to collect particulate matter contained in exhaust gas discharged from the diesel engine;
an air cleaner arranged at a location in front of the exhaust gas purification device and above the diesel engine, wherein the air cleaner includes an inflow pipe having an air intake opening;
a radiator located in a radiator space in front of the diesel engine; and
a hood having one or more air inlets arranged on a generally upper surface and one or more air inlets arranged on a generally forward facing surface,
wherein the air intake opening of the inflow pipe reaches a top end of the radiator in the radiator space.

16. The mower according to claim 15, wherein an upper end of the radiator is arranged adjacent the one or more air inlets arranged on the generally upper surface.

17. The mower according to claim 15, wherein the generally upper surface decreases in height toward a rear end of the mower.

18. The mower according to claim 15, wherein the generally forward facing surface faces largely forward and slightly upward.

19. The mower according to claim 15, wherein air entering the hood via the one or more air inlets arranged on the forward facing surface can pass through an upper portion of the radiator to provide cooling air around to the exhaust gas purification device.

20. The mower according to claim 15, wherein air entering the hood via the one or more air inlets arranged on the upper surface can pass into the air intake opening coupled to the air cleaner and being located behind an upper end of the radiator.

* * * * *